United States Patent Office 3,810,743
Patented May 14, 1974

---

3,810,743
THERMAL CONDITIONING OF MOLTEN GLASS
Frank J. Rau, Pittsburgh, and Joseph R. Staahl, Jr., Conneaut Lakes, Pa., assignors to PPG Industries, Inc., Pittsburgh, Pa.
Filed Feb. 9, 1973, Ser. No. 330,904
Int. Cl. C03b 5/04
U.S. Cl. 65—29                                                9 Claims

ABSTRACT OF THE DISCLOSURE

The refiner portion of a tank for melting glass is provided with a plurality of front-end-firing burners and means for sensing the temperature of the glass at suitable locations in the refiner portion of the tank. Control means responsive to the temperature-sensing means are used to make relatively small adjustments in the rate of firing the front-end-firing burners. This makes it possible to control, as desired, the temperature of the glass in the canal and the regime of temperatures in the refiner product of the tank. The other benefits of using front-end-firing burners (control of silica defects) are substantially maintained, while the establishment of particular thermal patterns and closer control of glass temperature improves the quality and throughput of the product flat glass.

CROSS REFERENCE TO RELATED APPLICATIONS

This application is related to application Ser. No. 138,699, filed Apr. 29, 1971 in the names of George A. Pecoraro, John S. McConnell and Leonard A. Knavish, which describes the use of front-end-firing burners in the refiner portion of a tank for melting flat glass, as a mode of controlling the development of silica defects in the product flat glass. This application is also related to application Ser. No. 116,368, filed Feb. 18, 1971 in the names of Leonard A. Knavish and James R. Schornhorst, which describes a method for overcoming thermal instabilities in the refiner or conditioner of a glass melting furnace. Both related applications are commonly assigned and are incorporated by reference herein. Application Ser. No. 138,699 is now U.S. Pat. No. 3,734,701 issued May 22, 1973; application Ser. No. 116,368 is now U.S. Pat. No. 3,776,710 issued Dec. 4, 1973.

BACKGROUND OF THE INVENTION

This invention relates to the manufacture of flat glass, and preferably to the preparation of a flowing body of molten soda-lime glass of desired temperature, homogeneity, and other charateristics for continuously forming high-quality glass. Particularly, it relates to the control of temperatures within the conditioner or refiner portion of the melting tank.

The general concept of controlling a temperature by sensing the temperature and then regulating the same by controlling the flow of heating or cooling fluid to influence the temperature being controlled is, of course, old. In the prior art, however, the applicability of this concept to the problem of controlling temperatures in the canal and refiner or conditioner portions of a float line has been found to be limited. It is known, for example, that the temperature at a desired location in the canal can be controlled by causing cooling air to flow at a suitable rate through the canal above the molten glass therein. This may be done open- or closed-loop, in accordance with the output of a suitable temperature sensor located in the canal. It has developed that this practice sometimes exhibits serious disadvantages, particularly because it is uneconomical to use heated cooling air, and when ambient-temperatures are used, the control action tends to be too drastic. In other words, with ambient-temperature air, it is necessary to establish and maintain a relatively fine control on the flow of the air in order to obtain a desirable cooling effect. At that, the temperature of the air varies with changes in the weather, etc. Moreover, the practice, though useful for controlling the temperature of the glass in the canal, does not provide a means for regulating the regime of temperatures within the refiner or conditioner portion of the furnace. In some circumstances it is desirable to influence convective flows of molten glass in the refiner or conditioner. This is particularly so if thermal instabilities and consequent defect-causing flows are to be avoided.

It is known, moreover, to regulate the regime of temperatures within the refiner or conditioner of a glass furnace by means of hairpin coolers. Thus, in accordance with one commercial practice, it is known to locate immersion-type (bent-tube) thermocouples within the refiner portion of the float line in the vicinity of the drop arch or shadow wall or other means of segregating the headspace of the melter from the headspace of the refiner. In this practice, the refiner portion of the tank is provided with a plurality of hairpin coolers that are mounted on carriages so that they may be inserted more or less deeply into the furnace, in accordance with the output of the immersion-type thermocouples. Although this practice yields a kind of control, it has particular disadvantages. The coolers, being foreign objects located within the headspace of the refiner, are subjected to attack and degradation by the furnace atmosphere. Problems of this kind may be more serious if the furnace is provided with front-end-firing burners, as is many times desirable for the purpose of combating the development of silica defects in the product glass. Moreover, the hairpin coolers themselves may be a part of the problem with respect to the development of such defects, since their relatively cold surfaces provide a site for the condensation of some of the components of the refiner headspace atmosphere. Subsequently, whenever the position of the coolers is adjusted, there is a tendency for condensed particles to flake off the coolers and onto the surface of the molten glass, thereby creating defects.

One of the principal problems associated with prior methods of glass furnace refiner or conditioner operation has been the development of an optical defect in the finished glass known as ream or striae. Ream or striae is characterized as visually observable optical distortion having a short focal length. In typical soda-lime glass, variations in index of refraction due to inhomogeneities related to the melting and refining or conditioning process cause optical distortion having focal lengths of less than about 0.5 inch. This sharply defined distortion is offensive to the eye when viewed over a wide range of viewing angles. Strictly speaking, ream is all inhomogeneity in glass characterized by index of refraction variations. When the inhomogeneities are thin lamina in a sheet of glass and are aligned in parallel fashion, there is no apparent defect in the glass when viewed toward a major surface or plane of the glass. However when the parallelism or flat shape of inhomogeneities are disturbed, the noticeable distortion becomes evident. Ream is used hereafter to mean optical distortion-causing ream.

Ream may have its origin in non-homogeneous batch materials, since variations of composition with respect to time in the raw batch material fed to the glass furnace result in differences with respect to both time and position in the finished ribbon of glass. This is because of unequal flow paths through the process.

Ream may have its origin in the refractory materials making up the glass furnace. Dissolution of refractory at a particular location can cause a persistent ream line to appear in the finished glass.

Both of the aforementioned types of ream may result in persistent ream in some confined region of the glass unless the impurities are diverted from the main flow of glass to the forming process.

Ream may also be caused in the glass conditioning process. If the top of the glass is cooled too quickly relative to the bottom, a thermal convection gradient is established in the glass which is sufficient to bring sporadic flows of surface glass down into the body or pool of molten glass. Because of volatilization the surface glass is generally of a slightly different composition than glass beneath the surface. Thus, compositional inhomogeneites result as evidenced by ream in the finished glass.

In the practice of this invention temperatures are established and maintained throughout the refiner or conditioner which minimize the causes of defects while providing glass for forming at closely held temperatures.

SUMMARY OF THE INVENTION

The present invention provides an improved method for conditioning molten glass in preparation for forming. The practice of this invention has been found to yield particularly beneficial results in the conditioning of soda-lime-silica glass compositions for forming by the float method. For example, the operation of a conditioner or refiner of a regenerative furnace with the temperature regime of this invention has been demonstrated to significantly improve temperature control of glass for forming. Float glass formed from glass so conditioned has been found to have noticeably fewer and less intense ream defects than glass produced at the same facility without the control provided by this invention.

The practice of this invention requires establishing and maintaining a controlled temperature difference across the length of the refiner or conditioning section of a glass furnace. This longitudinal temperature profile is preferably characterized by glass temperatures along or near the center of the furnace with an upper or upstream temperature being the temeprature of the molten glass just after entering the conditioning section and a lower or downstream temperature being the temperature of the molten glass just before leaving the conditioning section. There is a general heat loss from molten glass in the conditioning section; this is true of a conditioning section operated according to this invention as well as one conventionally operated. Thus, the upstream temperature is greater than the downstream temperature. Using a typical melter firing and a desired forming temperature, an arbitrary or preset temperature difference between the upstream temperature and the downstream temperature may be established. This is called a fixed mean temperature difference for convenience. This may also be established by taking entering and leaving glass temperatures over a long period of time and averaging them to obtain a mean glass entry temperature and a mean glass delivery temperature, their difference being established as the fixed mean temperature difference. These mean temperatures may be routinely brought up to date by new temperatures and the elimination of oldest emperatures on a first-in first-out basis.

The longitudinal temperature difference that is established and maintained in the practice of this invention is proportional to deviations in the entry or upstream glass temperature. For example, if the entry glass temperature increases by 10° F., the temperature difference increases from zero to 10° F. and preferably increases from about 5 to 8° F.; that is the delivery or downstream temperature is controllably permitted to increase only from about 2 to 5° F. A precise way of stating the established longitudinal temperature regime is to state that the temperature difference between the entry glass temperature and the delivery glass temperature is established equal to a fixed mean temperature difference plus a constant times the difference between the entry glass temperature and a mean entry glass temperature. The constant must lie between zero and one and is preferably between 0.5 and one.

The practice of this invention also requires that a transverse or lateral temperature profile be established across the width of the refiner or conditioning section, particularly in a region close to where molten glass is delivered from the conditioning section for forming. The central glass flowing in the center of the furnace is to be held at a temperature sufficiently higher than the temperature of glass along at least one side of the conditioning section to cause an outward or sideward surface flow sufficient to move buoyant impurities toward the sides.

It has also been found useful to establish a temperature difference across the entire width of the conditioning section when persistent ream is encountered in one side of the continuous sheet of glass being produced. A sufficient temperature difference is established to move the defect toward the colder side of the furnace and to the edge or out of the sheet of glass being produced. By utilizing a furnace having skim kilns along each side at its downstream end and by providing transverse controllable heating flames upstream of each of these skim kilns, it is possible to establish both the longitudinal and transverse temperature profiles of this invention. Thus, it is possible to use controlled heating rather than conventional surface cooling to improve the conditioning of molten glass in preparation for forming.

DESCRIPTION OF THE PREFERRED EMBODIMENT

A complete understanding of the invention may be obtained from the drawings and the detailed description thereof which follows.

Figure 1:
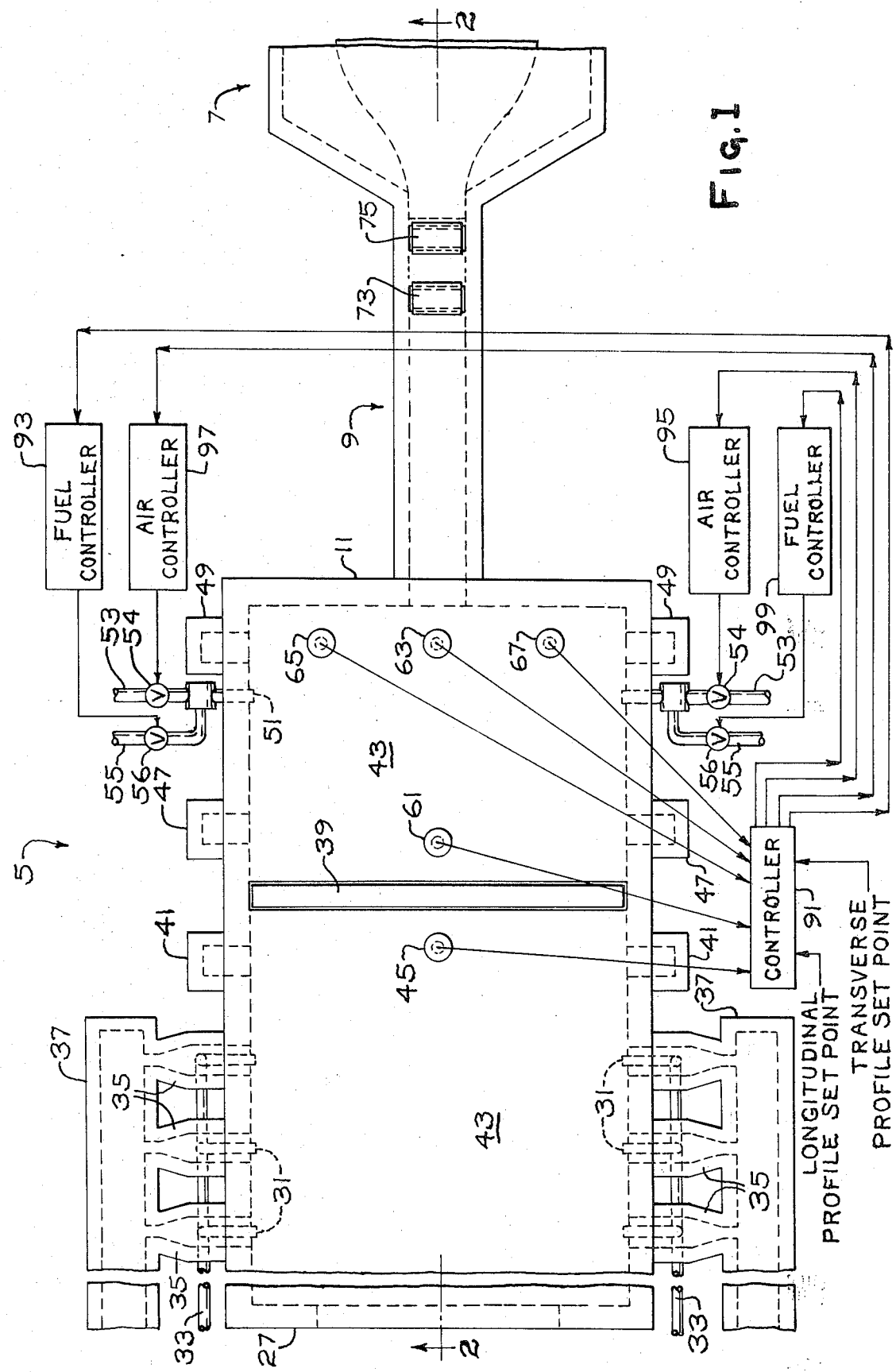
FIG. 1 is a plan view of a glass furnace and a float forming chamber connected thereto by a delivery canal.
Figure 2:
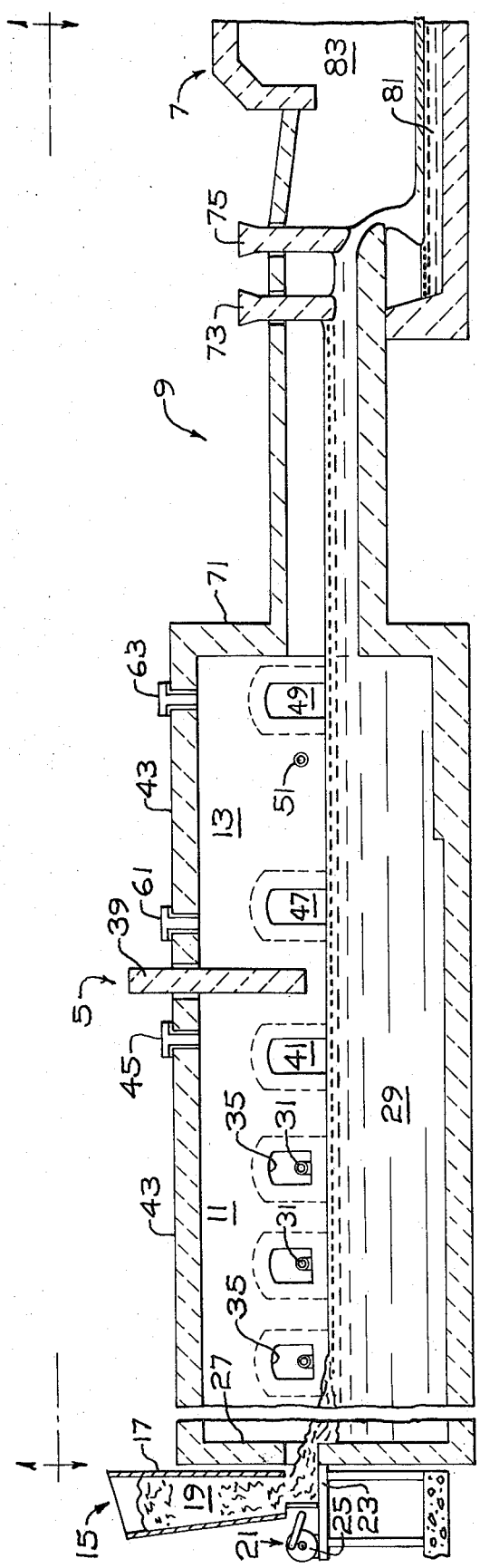
FIG. 2 is a longitudinal sectional view of the glass furnace canal and a float forming chamber taken along line 2—2 of FIG. 1.

As shown in FIGS. 1 and 2 the glass making apparatus, of which this invention is an improvement, comprises a melting and refining furnace 5 connected to a float chamber 7 through a delivery canal 9. The glass furnace 5 is divided into two sections, a melting section 11 and a refiner or conditioning section 13. Connected to the end of the furnace 5 is an apparatus for feeding raw batch materials into the furnace. This batch feeder 15 is shown only in FIG. 2 and typically comprises a hopper 17 into which raw batch materials 19 are regularly charged. The hopper 17 is positioned above a batch feeder mechanism 21, which may be a shelf 23 in combination with a pusher 25 for pushing raw batch materials into the glass tank through an opening in a back end wall 27 of the melter 11. Alternatively, the batch feeding mechanism 21 may comprise what is commonly known as blanket feeder. Raw batch material 19 may include cullet as well as raw materials, or cullet may be fed separately to the melter. As seen in FIG. 2, batch materials float on molten glass 29 within the melter 11 until the raw batch materials are melted to form glass.

Heat is supplied to the melting section 11 of the furnace 5 by gas or oil burners 31 extending into the headspace above the molten glass 29 in the melting section 11. These burners are fuel pipes 31 connected to a fuel manifold 33. Combustion air is supplied to the headspace above the molten glass 29 from ports 35 which surround the burner pipes 31 and are connected to a combustion air header 37. The arrangement of these elements is that of a conventional regenerative fired glass melting tank or furnace. The improvement of this invention may be applied to the operation of recuperative glass melting tanks or furnaces as well as regenerative ones.

The melting section 11 of the furnace 5 is separated from the refining or conditioning section 13 of the furnace by a shadow wall 39 extending down through the headspace above the molten glass 29 into close proximity of the top surface of the molten glass 29 within the furnace. At the downstream end of the melting section are a pair of skim doghouses 41 into which surface glass may flow carrying with it buoyant impurities. The furnace 5 has a roof 43, as is typical of glass melting furnaces. Positioned within the roof 43 of the furnace at the downstream end of the melting section 11, and preferably near the center of the furnace 5, is a radiation pyrometer, or other temperature-sensing device, which is effective to detect the temperature of the glass beneath the sensing device along the center of molten glass flow from the melting section 11 into the conditioning section 13 of the furnace.

Along the sides of the conditioning section 13 are skim kilns 47 and 49 into which surface material floating on the molten glass may flow. Extending into the conditioning section along each side are burners 51. These burners are preferably located about one to three feet above the surface of the molten glass 29 and are preferably aimed across the conditioning section at an elevated angle of at least 5 and preferably 10 degrees from horizontal. Each burner 51 is connected to a combustion air line 53 having a control valve 54 and a fuel line 55 having a control valve 56. In general, air and fuel, preferably gas, will be fed to the burner 51 at a ratio of air to gas ranging between about 2:1 to about 30:1 and preferably within a range of about 5:1 to 20:1. This provides for a high-temperature flame with oxidizing conditions maintained extending outwardly over the molten glass 29 in the conditioning section 13.

In the roof 43 of the conditioning section of the furnace are positioned a plurality of glass temperature-sensing devices. An upstream glass temperature-sensing device 61 is positioned to view the glass near the centerline of the furnace just after the molten glass flows beneath the wall 39 into the conditioning section 13 of the furnace. This temperature-sensing device and all of those in the refiner are generally of the same type already described for use in the melting section. Near the downstream end of the refining or conditioning section is a glass temperature-sensing means 63 positioned near the center of the furnace to detect the temperature of the central flow of glass out of the conditioning section toward the forming chamber 7 through the delivery means 9. Near the downstream end of the conditions section and spaced outwardly from the center of the furnace on each side of the center of the furnace are side glass temperature-sensing devices, one on the left side of the furnace 65 and one on the right side of the furnace 67. These temperature-sensing devices view molten glass near the delivery end of the conditioning section and slightly to the left and right, respectively, of the opening into the delivery means 9.

The glass furnace is provided with a front wall 71 which has a discharge opening where it is connected to the delivery means 9. The delivery means 9 typically comprises a narrow canal. In one of the preferred embodiments of this invention and this canal is provided with a shutoff tweel 73 and a metering tweel 75 which are employed to control the rate of molten glass flow from the furnace into a forming chamber. Connected to the delivery means 9 is a forming chamber 7. In the preferred embodiment this is a float forming chamber comprising a containment structure suitable for holding a pool of molten metal 81 on which molten glass 82 may be floated and formed into a continuous ribbon or sheet of glass and a space over the pool of molten metal comprising a protective, non-oxidizing atmosphere 83 for protecting the molten metal in the forming chamber. The molten metal is preferably tin as in all conventional float-forming processes.

In the practice of the present invention once the appropriate temperatures are established within the conditioning section of the glass furnace, they are maintained by appropriate control which is illustrated in FIG. 1. All of the glass temperature-sensing means are connected by conventional electrical signal conductors to a controller 91. The controller 91 may be an analog computer, a digital computer, a combination of conventional analog controllers or the like. The controller 91 contains suitable circuitry to combine signals from a plurality of sensing devices and to generate output signals of the nature described below.

In the practice of the present invention, the controller 91 has appropriate circuitry to generate a control signal responsive to input signals according to conventional proportional, integral and derivative control modes. The controller 91 is provided with electronic filters to filter the signals received from the temperature-sensing pyrometer 45 and the temperature-sensing pyrometer 61 and with circuitry to combine the filtered signals from these two pyrometers. The combined signal is then directed to circuitry which generates a set point control signal for the glass temperature end of the conditioning section of the furnace. The circuitry of the controller 91 to accomplish this function is conventional signal combining and control circuitry which follows the conventional proportional, integral and derivative control modes, well known in the art of controlling processes. A longitudinal profile set point is preset in the controller or may be manually provided to the controller from time to time.

The controller 91 is further provided with conventional control circuitry having proportional, integral and derivative control signal generating characteristics to receive a transverse profile set point to establish the desired temperature difference across the width of the conditioning section of the furnace, for receiving the generated signal from the first described controlled circuitry of the controller to establish an average glass temperature target for glass leaving the conditioning section to go to the forming chamber, and for receiving the electrical signals generated by the glass temperature-sensing pyrometer 63, 65 and 67. This circuitry in the controller 91 may be such as to generate separate control signals for fuel and combustion air flows ot the burners 51. Alternatively, the burners 51 may be provided to have constant air or gas flow and the system designed and constructed to generate a signal control signal for the fuel or air to be controlled as the case may be. The controller 91 is connected to a fuel controller 93 for controlling the fuel to the left side of the furnace and to a fuel controller 95 for controlling the fuel to the right side of the furnace. It is optionally connected to an air controller 97 for controlling air to the left side of the furnace and to an air controller 99 for controlling air to the right side of the furnace. All signal-conducting connections between sensing means and the controller 91 and between the controller 91 and the fuel and air controllers are preferably insulated, shielded and grounded electrical signal conductors which effectively shield the signals carried thereon from excessive electrical noise in the vicinity of the glass furnace.

The fuel controllers and air controllers are connected, respectively, to fuel control valves 56 and air control valves 54 in the fuel line 55 and the air line 53 connected to each burner 51.

In the operation of an improved glass tank according to this invention it has been found beneficial to employ long-term average temperatures detected by sensing means 45 and 61 over a period of an hour or more to establish the generated signal from the first-described circuit of the controller 91. It has also been found beneficial to establish the longitudinal profile set point such that the temperature difference between the glass as detected by sensing means 61 and the temperature of the glass as detected by sensing means 63 is maintained close to a constant difference over long periods of time. This may be described as maintaining the temperature difference between glass entering the conditioning section and glass leaving the conditioning section proportional to the temperature of the glass entering the conditioning seciton less some pre-established mean for the temperature of glass entering the conditioning section with the portionality equal to one in the extreme. In this way the existing glass temperature continues to follow the entering glass temperature. It has been found, however, to be even more preferable to have the proportionality at greater than 0.5 and preferably about 0.7. This means that if the entering glass temperature as detected by temperature-sensing means 61 increases 9° F., the targeted temperature to which the glass would be controlled beneath temperature-sensing means 63 would be increased about 3° F. from where it had been prior to the change in entering glass temperatures. This longitudinal temperature profile has been found to minimize the generation of ream in the conditioning section due to excessive top surface cooling and consequent thermal instability within the molten glass flowing through the conditioning section. An appreciation for the general problem of thermal instability in a molten glass furnace and the development of ream within glass coming from such a furnace is fully described in the copending application of Knavish and Schornhorst, Ser. No. 116,367 filed Feb. 18, 1971 and entitled "Manufacture of Glass." The copending application is herein incorporated by reference.

The establishment and maintenance of a transverse temperature profile, that is a temperature difference between the molten glass as detected by temperature-sensing means 65 on the left side of the furnace and temperature-sensing means 67 on the right side of the furnace, has been found useful to move persistent ream which is attributable to conditions within the melting section 11 of the glass furnace. It has been found by establishing an appropriate transverse temperature profile that a persistent ream line may be moved toward the edge of the sheet of glass produced by the process. There, it may be cut from the continuous sheet of glass. An impurity may even be moved so far to one side or the other as to be effectively caused to flow transversely into a downstream skim kiln such as skim kiln 49. It has been found that by establishing a transverse temperature profile of from about 5 to about 15° F. that the molten glass within a conditioning section of the furnace may be caused to flow toward the colder side of the furnace sufficiently to move a persistent ream line outward and to thereby improve the quality of the continuous sheet of glass produced by the process.

Even when a symmetric transverse temperature profile is established, it has been found that by establishing and maintaining a temperature difference between the central glass temperature as detected by temperature-sensing means 63 and side glass temperatures as detected by sensing means 65 or 67 it is possible to cause some outward flow of surface glass into the skim kilns 49 at the downstream end of the conditioning section of the furnace. This may be accomplished by establishing both the rate of gas and air flow to both sides of the furnace and by establishing an appropriate angle to the burners 51 so that more or less heat may be directed toward the center section of the conditioner. Sufficiently greater heat is injected into the central portion of the conditioner than along the sides so as to establish an adequate outward flow at the surface of the molten glass to remove some impurities which float on the glass downstream through the conditioning section. A temperature difference of from 5 to 20° F. between the center glass temperature and the side glass temperature has been found to be generally sufficient for this purpose.

The present invention will be further appreciated from the example which follows:

EXAMPLE

A soda-lime-silica glass having a target composition as follows is melted in a regenerative glass making furnace like that shown in FIGS. 1 and 2. The glass composition is: 73.1% $SiO_2$, 13.6% $Na_2O$, 0.03% $K_2O$, 8.9% CaO, 3.8% MgO, 0.15% $Al_2O_3$, 0.3% $SO_3$ and 0.12% $Fe_2O_3$. Sufficient raw batch materials are fed to the furnace to produce 400 tons of glass per day.

Connected to the furnace through a conventional canal is a conventional float forming chamber or bath. A continuous sheet or ribbon of glass about 10 feet wide is formed in the bath, withdrawn through an annealing lehr and ultimately cut into useful sizes.

The glass produced is evaluated for ream by visual inspection and by automatic inspection devices such as described in U.S. Pat. No. 3,199,401 and U.S. Pat. No. 3,609,380. The description of ream in U.S. Pat. No. 3,199,401 and the descriptions in both patents relating to the detection and evaluation of the optical quality of glass are incorporated by reference. For the purposes of this example the ream is noted in the center third and each of the outer thirds of the ribbon or sheet of glass. The ream is reported as an intensity and frequency based on a comparison to seven standard ream samples ranging from glass with no ream to glass with a heavy, pronounced line of ream.

The temperatures of the glass are measured by total radiation pyrometers (Honeywell Radiamatic pyrometers manufactured by Honeywell Controls, Inc., Washington Park, Pa.). These pyrometers are connected to a digital computer (IBM-1800, IBM Corp., Armonk, N.Y.) to convert the electrical signals to useful form. The connections are conventional, shielded and grounded, insulated wires. The computer, which serves as a controller 91, is set up to provide the necessary control circuitry to generate control signals responsive to the sensed temperature signals. During an initial period of operation the control is not established, rather the conventional operation of the furnace is monitored. During a 24-hour monitoring period the glass leaving the conditioner has a temperature variance with a standard deviation of 0.558. During the period, ream averages 2 on the scale of 7 in the left side and the center of the glass sheet; ream averages 3 in the right side of the glass sheet. Over a 48-hour period the central glass temperature detected by pyrometer 63 varies from 2120° F. to 2135° F.; the side temperature detected by pyrometer 65 varies from 2105° F. to 2115° F.; and that detected by pyrometer 67 varies from 2112° F. to 2118° F.

Next, a temperature pattern is established according to this invention. The temperature of the glass as detected by pyrometer 61 continues to vary from 2290° F. to 2305° F. Heating flames are controllably directed across the molten glass. Each burner is located about 10 feet upstream from the front wall of the furnace and about 2 feet above the surface of the glass. Air is fed to each burner at an average rate of about 100 m.s.c.f.h.; natural gas is fed to each burner at an average rate of about 5000 s.c.f.h. so that an approximately air-to-gas ratio of 20:1 is established. Air and gas are varied to maintain temperatures once they are established. Variations in air and gas flows are about ±4%.

The temperature of the glass, as detected by pyrometer 63, is held at 2122° F. for 24 hours; that detected by pyrometer 65 is held between 2104° F. and 2105° F. and that detected by pyrometer 67 is held between 2113° F. and 2114° F. The ream defect diminishes within 6 hours, and over the entire period the ream averages 1.5 in the left side, 0.5 in the center and 2 in the right side. Stable forming conditions are obtained with virtually no variation in the temperature of molten glass being delivered for forming.

The transverse temperature profile is then decreased 1° F. to attempt to move the ream out from the right side of the glass sheet. For a period of 24 hours fuel to the left burner is increased relative to that to the right burner. A transverse temperature profile is established in which the temperature detected by pyrometer 65 is 2105° F. and that detected by pyrometer 67 is 2113° F., each with less than 0.5° F. variation. After about 8 hours the ream in the right side of the ribbon still averages 2 but has moved toward the edge where it may be trimmed with less glass waste.

Over the entire period of control, including the deliberate transverse profile change, the standard deviation for the central glass temperature was only 0.323, significantly less than for the uncontrolled period. Also, the longitudinal profile is established during the period with a proportionality of 0.67. Thus, when the entry glass temperature increases 3° F., the target or control exit or delivery temperature is limited to an increase of 1° F.

This description of the present invention has been specific in order to illustrate the best mode contemplated for practicing the invention and in order to facilitate an understanding of the invention. Accordingly, this description is not intended to limit the scope of the invention which is defined by the appended claims.

We claim:

1. In the method of manufacturing flat glass comprising feeding raw materials to a glass melting furnace, having a melting section and a conditioning section, melting the raw materials to form molten glass in the melting section, gradually cooling the molten glass in the conditioning section, delivering molten glass from the conditioning section to a forming apparatus and forming the molten glass into a continuous sheet of glass, the improvement comprising:
   (a) establishing and maintaining a temperature difference across the width of the conditioning section from the center of the conditioning section to each side thereof by applying heat to a portion of the glass in the conditioning section sufficient to cause impurities in the central portion to move toward the sides of the conditioning section so as to reduce the presence of ream in the central portion of the continuous sheet of glass; and
   (b) establishing and maintaining a temperature difference across the width of the conditioning section from the vicinity of molten glass entry from the melting section to the vicinity of the molten glass delivery for forming by varying heat applied to a portion of the glass in the conditioning section, which temperature difference increases proportional to the difference between the temperature of the molten glass entering the conditioning section from the melting section and a fixed means for such glass entry temperature, whereby the temperature of the molten glass delivered for forming is sufficiently invariant to permit forming under stable conditions.

2. The method according to claim 1, wherein the molten glass is delivered to a float forming chamber having a central temperature varying less than about ±5° F.

3. The method according to claim 1 wherein the steps of establishing and maintaining temperature differences are accomplished by:
   (a) sensing the temperature of the molten glass in the central portion of the conditioning section in the vicinity of molten glass entry into the conditioning section and in the vicinity of molten glass delivery from the conditioning section;
   (b) sensing the temperature of the molten glass at at least two locations near the sides of the conditioning section, one location being on each side of the central portion and both locations being in the vicinity of molten glass delivery from the conditioning section; and
   (c) establishing at least two heating flames over the molten glass in the conditioning section, one extending over the glass from each side of the conditioning section, the amount of heat input of the flames being established responsive to the sensed temperatures sufficient to cause the central glass temperature in the vicinity of glass delivery to be less than the central glass temperature in the vicinity of glass entering by an amount which is a fixed mean difference plus less than one times the difference between the glass entry temperature and the fixed mean for the glass entry temperature.

4. The method according to claim 3 wherein the heat input of the flames is established sufficient to cause the central glass temperature in the vicinity of glass delivery to vary less than about 0.5 times the difference between the glass entry temperature and the fixed mean for the glass entry temperature.

5. The method according to claim 3 wherein the heat input of the flame on one side of the conditioning section is sufficiently greater than the heat input of the flame on the other side of the conditioning section to cause more glass to flow toward the side of lower heat input than to the other side.

6. The method according to claim 5 wherein the continuous sheet of glass is observed and the presence of persistent ream is detected in a portion of the glass closer to one side thereof, and the heat input of the heating flame on the side of the conditioning section corresponding to the side of the glass wherein the persistent ream is detected is lowered relative to the heat input of the heating flame on the other side, and the heat input of the heating flame on the other side is increased relative to that of the heating flame on the side corresponding to the side of the glass wherein the persistent ream is detected, such relative increasing and lowering of heat inputs being sufficient to establish a temperature of the molten glass in the conditioning section in the vicinity of delivery for forming on the side corresponding to the side of glass wherein the persistent ream is detected to be from about 5° F. to about 15° F. lower than the temperature of the molten glass at a corresponding location on the other side of the conditioning section.

7. In the apparatus for manufacturing flat glass comprising a glass furnace having a melting section and a conditioning section, means for feeding raw materials to the melting section, means for melting the raw materials to molten glass in the melting section, means for cooling the molten glass in the conditioning section, means for forming the molten glass into a continuous sheet of glass and means connecting the conditioning section to the forming means for delivering molten glass from the conditioning means to the forming means, the improvement comprising
   (a) means for sensing, the temperature of molten glass entering the central portion of the conditioning section and for sensing the temperature of molten glass in its central and edge portions in the vicinity where it leaves the conditioning section;
   (b) means connected to the temperature-sensing means to generate a control signal responsive thereto; and
   (c) controllable means for directing a flame a spaced distance above and across the surface of molten glass from each side of the conditioning section, which flame directing means is responsive to a control signal generated by the control signal generating means.

8. The apparatus according to claim 7 wherein the controllable means for directing a flame comprises a gas burner aimed across the width of the conditioning section at an angle elevated from the horizontal and having a controllable air valve and a controllable gas valve.

9. The apparatus according to claim 7 further comprises a valve controller connected to the gas valve and to the means for generating a control signal, the valve controller being effective for increasing the flow of gas responsive to a generated signal indicating a decrease in incoming glass temperature.

References Cited
UNITED STATES PATENTS

| | | | |
|---|---|---|---|
| 2,866,838 | 12/1958 | Paxton | 65—162 X |
| 3,457,059 | 7/1969 | Boettner | 65—136 X |
| 3,506,427 | 4/1970 | Griem, Jr. | 65—162 |
| 3,600,149 | 8/1971 | Chen et al. | 65—29 |
| 3,658,503 | 4/1972 | Prislan | 65—136 X |

ARTHUR D. KELLOGG, Primary Examiner

U.S. Cl. X.R.
65—136, 162, 337

UNITED STATES PATENT OFFICE
CERTIFICATE OF CORRECTION

Patent No. 3,810,743    Dated May 14, 1974

Inventor(s) Frank J. Rau and Joseph R. Staahl, Jr.

It is certified that error appears in the above-identified patent and that said Letters Patent are hereby corrected as shown below:

Claim 1, column 9, line 53, "width" should read -- length --.

Claim 1, column 9, line 61, "means" should read -- mean --.

Claim 3, column 10, line 12, "centrol" should read -- central --.

Signed and sealed this 17th day of September 1974.

(SEAL)
Attest:

McCOY M. GIBSON JR.         C. MARSHALL DANN
Attesting Officer           Commissioner of Patents